United States Patent
Gomi et al.

(10) Patent No.: US 8,522,902 B2
(45) Date of Patent: Sep. 3, 2013

(54) INVERTED PENDULUM TYPE VEHICLE

(75) Inventors: Hiroshi Gomi, Saitama (JP); Shinichiro Kobashi, Saitama (JP); Taiji Koyama, Saitama (JP); Hideharu Izumi, Saitama (JP); Kazuya Kuwabara, Saitama (JP); Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/395,578

(22) PCT Filed: Sep. 18, 2009

(86) PCT No.: PCT/JP2009/004724
§ 371 (c)(1),
(2), (4) Date: Mar. 12, 2012

(87) PCT Pub. No.: WO2011/033575
PCT Pub. Date: Mar. 24, 2011

(65) Prior Publication Data
US 2012/0168235 A1    Jul. 5, 2012

(51) Int. Cl.
*B62D 61/00* (2006.01)
*B62K 15/00* (2006.01)
*B62K 1/00* (2006.01)

(52) U.S. Cl.
USPC ............. 180/21; 180/7.1; 180/208; 280/205

(58) Field of Classification Search
USPC ................ 180/7.1, 21, 65.1, 208, 273, 282; 280/47.3, 47.32, 205; 701/22, 49, 70, 93, 701/99, 124
See application file for complete search history.

(56) References Cited

U.S. PATENT DOCUMENTS

| 6,003,624 | A  | * | 12/1999 | Jorgensen et al. | 180/6.5 |
| 6,553,271 | B1 | * | 4/2003  | Morrell          | 700/75  |
| 6,561,294 | B1 | * | 5/2003  | Kamen et al.     | 180/21  |
| 6,715,845 | B2 | * | 4/2004  | Kamen et al.     | 301/111.03 |
| 6,837,327 | B2 | * | 1/2005  | Heinzmann        | 180/218 |
| 7,004,271 | B1 | * | 2/2006  | Kamen et al.     | 180/21  |
| 7,823,676 | B2 | * | 11/2010 | Yamada et al.    | 180/218 |
| 7,866,429 | B2 |   | 1/2011  | Ishii et al.     |         |
| 8,011,459 | B2 | * | 9/2011  | Serai et al.     | 180/8.2 |

(Continued)

FOREIGN PATENT DOCUMENTS

| JP | 2008-168697 A | 7/2008 |
| JP | 2008-189017 A | 8/2008 |

(Continued)

*Primary Examiner* — Paul N Dickson
*Assistant Examiner* — Laura Freedman
(74) *Attorney, Agent, or Firm* — Carrier Blackman & Associates, P.C.; William D. Blackman; Fulchand P. Shende

(57) ABSTRACT

In an inverted pendulum type vehicle configured to travel on a ground surface while maintaining an upright posture under an inverted pendulum control, comprising a base frame supporting a propulsion unit, the propulsion unit including a main wheel configured to roll on the ground surface, and a seat unit provided on the base frame for supporting hips of a rider, the seat unit includes a saddle having at least a center located ahead of an axial line extending between a rotational center line of the main wheel and a gravitational center of the inverted pendulum type vehicle. Thereby, even when there is an obstacle on the ground surface behind the vehicle, the main wheel rolling on the ground surface is prevented from coming into contact with the obstacle, and the boarding of the rider on the vehicle is facilitated.

1 Claim, 10 Drawing Sheets

(56) References Cited

U.S. PATENT DOCUMENTS

| | | | |
|---|---|---|---|
| 8,016,060 B2* | 9/2011 | Miki et al. | 180/65.1 |
| 8,050,837 B2* | 11/2011 | Yamada | 701/70 |
| 8,160,794 B2* | 4/2012 | Fuwa | 701/70 |
| 8,170,780 B2* | 5/2012 | Field et al. | 701/124 |
| 8,170,781 B2* | 5/2012 | Fuwa | 701/124 |
| 8,201,653 B2* | 6/2012 | Strassman | 180/218 |
| 8,219,308 B2* | 7/2012 | Leeser | 701/124 |
| 8,220,571 B2* | 7/2012 | Gomi et al. | 180/21 |
| 8,224,524 B2* | 7/2012 | Nakashima et al. | 701/38 |
| 8,240,407 B2* | 8/2012 | Takenaka et al. | 180/7.1 |
| 8,249,773 B2* | 8/2012 | Kawada et al. | 701/36 |
| 8,265,774 B2* | 9/2012 | Senba et al. | 700/1 |
| 8,267,213 B2* | 9/2012 | Takenaka | 180/222 |
| 8,271,185 B2* | 9/2012 | Doi | 701/124 |
| 8,346,441 B2* | 1/2013 | Miki et al. | 701/49 |
| 2010/0070132 A1* | 3/2010 | Doi | 701/36 |
| 2010/0071984 A1* | 3/2010 | Doi et al. | 180/218 |
| 2010/0114421 A1* | 5/2010 | Doi | 701/29 |
| 2010/0126787 A1* | 5/2010 | Kawada | 180/21 |
| 2010/0168993 A1* | 7/2010 | Doi et al. | 701/124 |
| 2010/0280745 A1* | 11/2010 | Gorai | 701/124 |
| 2011/0067936 A1* | 3/2011 | Takenaka et al. | 180/21 |
| 2011/0067938 A1* | 3/2011 | Gomi et al. | 180/21 |
| 2011/0067939 A1* | 3/2011 | Takenaka | 180/21 |
| 2011/0067943 A1* | 3/2011 | Waita et al. | 180/311 |
| 2011/0068738 A1* | 3/2011 | Gomi et al. | 320/108 |
| 2011/0070997 A1* | 3/2011 | Gomi et al. | 476/66 |
| 2011/0070998 A1* | 3/2011 | Takenaka et al. | 476/68 |
| 2011/0071714 A1* | 3/2011 | Takenaka | 701/22 |
| 2011/0071715 A1* | 3/2011 | Akimoto et al. | 701/22 |
| 2011/0071752 A1* | 3/2011 | Takenaka et al. | 701/124 |
| 2011/0118968 A1* | 5/2011 | Takenaka et al. | 701/124 |
| 2011/0144845 A1* | 6/2011 | Takenaka | 701/22 |
| 2011/0209932 A1 | 9/2011 | Takenaka et al. | |
| 2011/0231013 A1* | 9/2011 | Smoot et al. | 700/245 |
| 2012/0046856 A1* | 2/2012 | Doi | 701/124 |
| 2012/0078482 A1* | 3/2012 | Takenaka et al. | 701/70 |
| 2012/0123647 A1* | 5/2012 | Doi et al. | 701/49 |
| 2012/0150408 A1* | 6/2012 | Takenaka et al. | 701/70 |
| 2012/0150410 A1* | 6/2012 | Takenaka et al. | 701/93 |
| 2012/0158255 A1* | 6/2012 | Takenaka et al. | 701/49 |
| 2012/0166049 A1* | 6/2012 | Akimoto et al. | 701/49 |
| 2012/0166056 A1* | 6/2012 | Akimoto et al. | 701/93 |
| 2012/0168236 A1* | 7/2012 | Hamaya et al. | 180/21 |
| 2012/0172169 A1* | 7/2012 | Gomi et al. | 475/197 |
| 2012/0173041 A1* | 7/2012 | Takenaka et al. | 701/1 |
| 2012/0173042 A1* | 7/2012 | Takenaka et al. | 701/1 |
| 2012/0173086 A1* | 7/2012 | Takenaka et al. | 701/48 |
| 2012/0173088 A1* | 7/2012 | Kobashi et al. | 701/49 |
| 2012/0173106 A1* | 7/2012 | Takenaka et al. | 701/70 |
| 2012/0173107 A1* | 7/2012 | Takenaka et al. | 701/70 |
| 2012/0173108 A1* | 7/2012 | Takenaka et al. | 701/70 |
| 2012/0173109 A1* | 7/2012 | Akimoto et al. | 701/70 |
| 2012/0173114 A1* | 7/2012 | Takenaka et al. | 701/99 |
| 2012/0175175 A1* | 7/2012 | Gomi et al. | 180/21 |
| 2012/0175176 A1* | 7/2012 | Hamaya et al. | 180/21 |
| 2012/0179352 A1* | 7/2012 | Takenaka et al. | 701/99 |

FOREIGN PATENT DOCUMENTS

| | | |
|---|---|---|
| JP | 2008-253565 A | 10/2008 |
| JP | 2009-040165 A | 2/2009 |
| WO | 2008/139740 A1 | 11/2008 |

* cited by examiner

INVERTED PENDULUM TYPE VEHICLE

TECHNICAL FIELD

The present invention relates to an inverted pendulum type vehicle configured to be propelled by a wheel or the like.

BACKGROUND OF THE INVENTION

A conventionally known inverted pendulum type vehicle travels while maintaining an upright posture by performing an inverted pendulum control based on a detection result of a tilt sensor (such as a gyro sensor). In conjunction with such an inverted pendulum type vehicle, it is known to tilt a vehicle body (hence the seating surface of a seat for supporting a rider) until a stopper engages the ground surface so that the vehicle may be kept stationary in a stable manner and the rider may be enabled to get on or off the vehicle with ease. See Patent document 1, for instance.

PRIOR ART DOCUMENT(S)

Patent Document(s)

Patent document 1: JP 2008-189017

BRIEF SUMMARY OF THE INVENTION

Task to be Accomplished by the Invention

According to this conventional inverted pendulum type vehicle, a certain torque is required to be applied to the base frame of the vehicle to tilt the vehicle until the stopper engages the road surface, and the resulting reaction causes a slight rotation of the drive wheels. However, if there is any obstacle (such as curbstone) immediately behind the drive wheels, the drive wheels are prevented from moving rearward, and this may cause inconvenience for the rider to get on the vehicle.

In view of such problems of the prior art, a primary object of the present invention is to provide an inverted pendulum type vehicle that allows a rider to get on the vehicle with ease even when there is an obstacle immediately behind the drive wheel of the vehicle without the drive wheel coming into contact with the obstacle.

Means to Accomplish the Task

To achieve such an object of the present invention, a first aspect of the present invention provides an inverted pendulum type vehicle (1) configured to travel on a ground surface (G) while maintaining an upright posture under an inverted pendulum control, comprising: a base frame (2) supporting a propulsion unit (3), the propulsion unit including a main wheel (85) configured to roll on the ground surface; and a seat unit (4) provided on the base frame for supporting hips of a rider (H); wherein the seat unit includes a saddle (63L, 63R) having at least a center (C) located ahead of an axial line (B) extending between a rotational center line (A) of the main wheel and a gravitational center (Gt1) of the inverted pendulum type vehicle.

According to a second aspect of the present invention, the saddle is provided with a seating surface (70La, 70Ra) which tilts forwards with respect to a horizontal line when the base frame is in the upright posture without a rider.

Effect of the Invention

According to the first aspect of the present invention, because the inverted pendulum control is performed when a rider gets aboard the vehicle in such a manner that the main wheel moves forward by causing the gravitational center of the inverted pendulum type vehicle (including a rider supported by the saddle) to move forward, even when there is an obstacle on the ground surface behind the vehicle, the main wheel rolling on the ground surface is prevented from coming into contact with the obstacle, and the rider is enabled to get aboard the vehicle with ease.

According to the second aspect of the present invention, the rider is enable to sit on the saddle with ease.

DETAILED DESCRIPTION OF THE PREFERRED EMBODIMENTS

Figure 1:
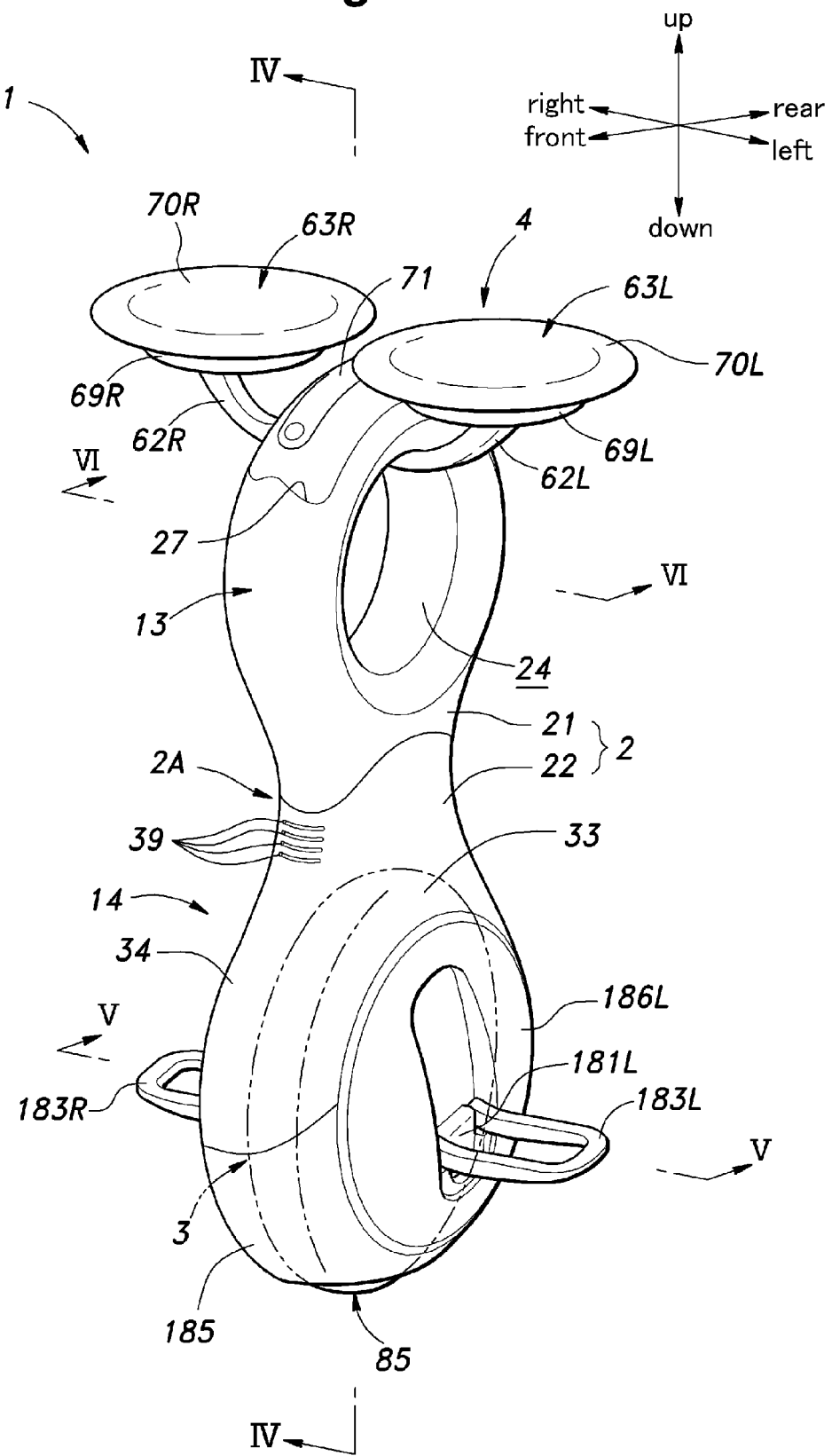
FIG. 1 is a perspective view of an inverted pendulum type vehicle embodying the present invention which is put ready for boarding (with a saddle and steps deployed)

An inverted pendulum type vehicle 1 embodying the present invention is described in the following with reference to the appended drawings. In the following description, the orientation and direction of the inverted pendulum type vehicle and components thereof are defined as indicated by the arrows representing the vertical, fore and aft and lateral directions in the drawings.

<Overall Structure of the Inverted Pendulum Type Vehicle>

Referring to FIG. 1 and FIGS. 3 to 5, the inverted pendulum type vehicle (vehicle) 1 includes a frame 2 consisting of a base frame forming a vertically extending frame structure, a propulsion unit 3 provided in a lower part of the frame 2, a seat unit 4 provided in an upper part of the frame 2 to support an object, an electric unit 11 provided in the frame 2 and a battery unit 10 for supplying electric power to the various units and sensors. The electric unit 11 includes an inverted pendulum control unit (which is referred to simply as a control unit in the following description) 5, a load sensor 6 and a tilt sensor 7. The control unit 5 controls the operation of the propulsion unit 3 according to the input signals from the various sensors according to an inverted pendulum control, and maintains the vehicle 1 in an upright posture. The vehicle 1 is provided with strain sensors 8L and 8R and rotary encoders 9L and 9R in appropriate parts thereof, separately from the electric unit 11.

<Structure of the Frame>

Figure 3:
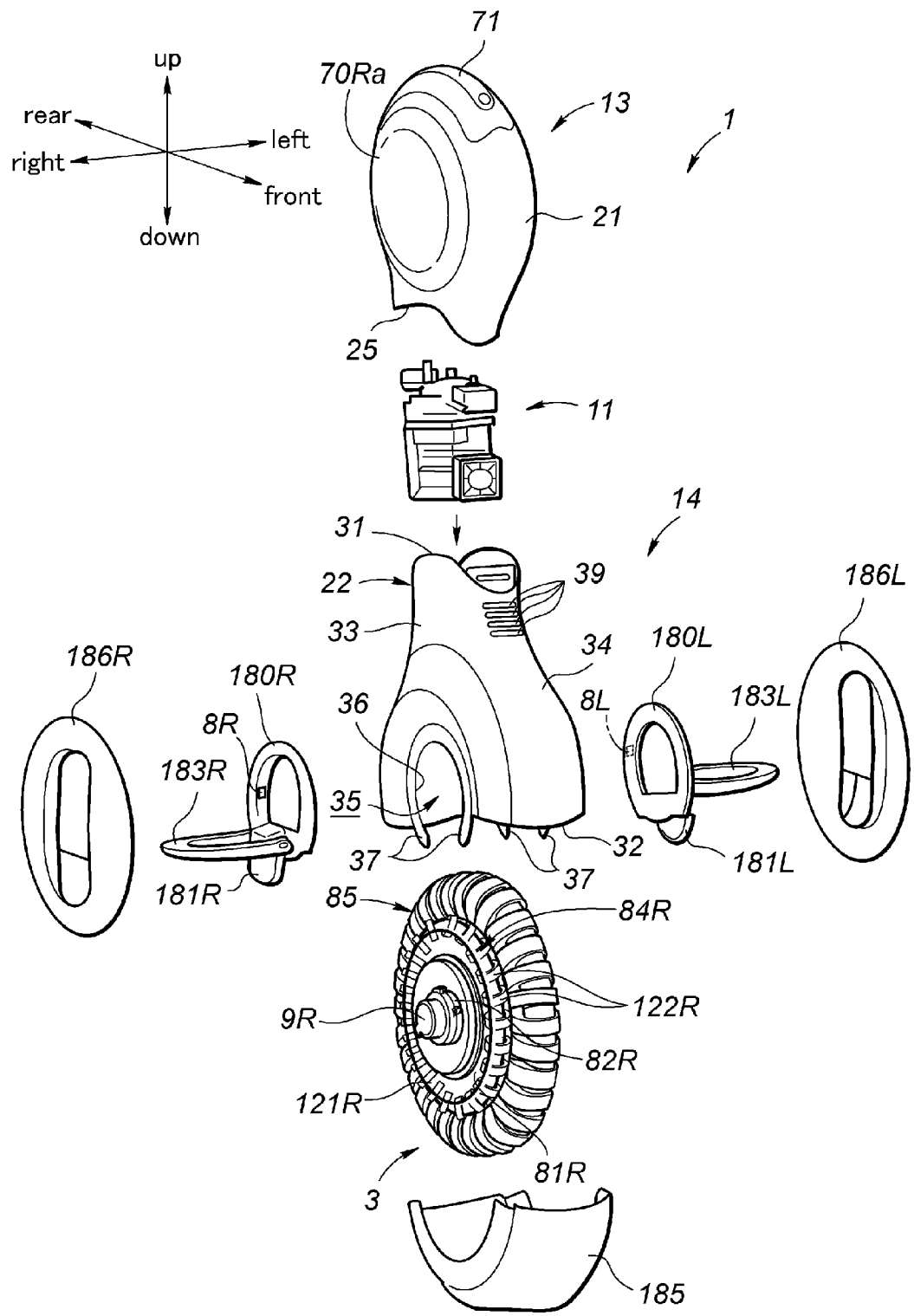
FIG. 3 is an exploded perspective view of the inverted pendulum type vehicle.

As shown in FIG. 1, the frame 2 consists of a hollow shell structure, and is given with a flattened shape by being more elongated in the fore and aft direction than in the lateral direction. The frame 2 is provided with a narrowed portion 2A in a vertically middle part thereof The narrowed portion 2A is reduced in the fore and aft dimension as compared to other parts of the frame 2, and is internally receives the electric unit 11 therein. The frame 2 is thus provided with the shape of numeral "8" as seen from the side. As shown in FIG. 3, the frame can be separated into an upper frame 21 and a lower frame 22 at the narrowed portion 2A. The upper frame 21 and the lower frame 22 are made of dry carbon (carbon fiber reinforced plastic: CFRP) prepared by thermally curing an appropriately shaped carbon prepreg sheet. As will be discussed hereinafter, the upper frame 21 and the lower frame 22 are connected to each other via the load sensor 6.

Figure 4:
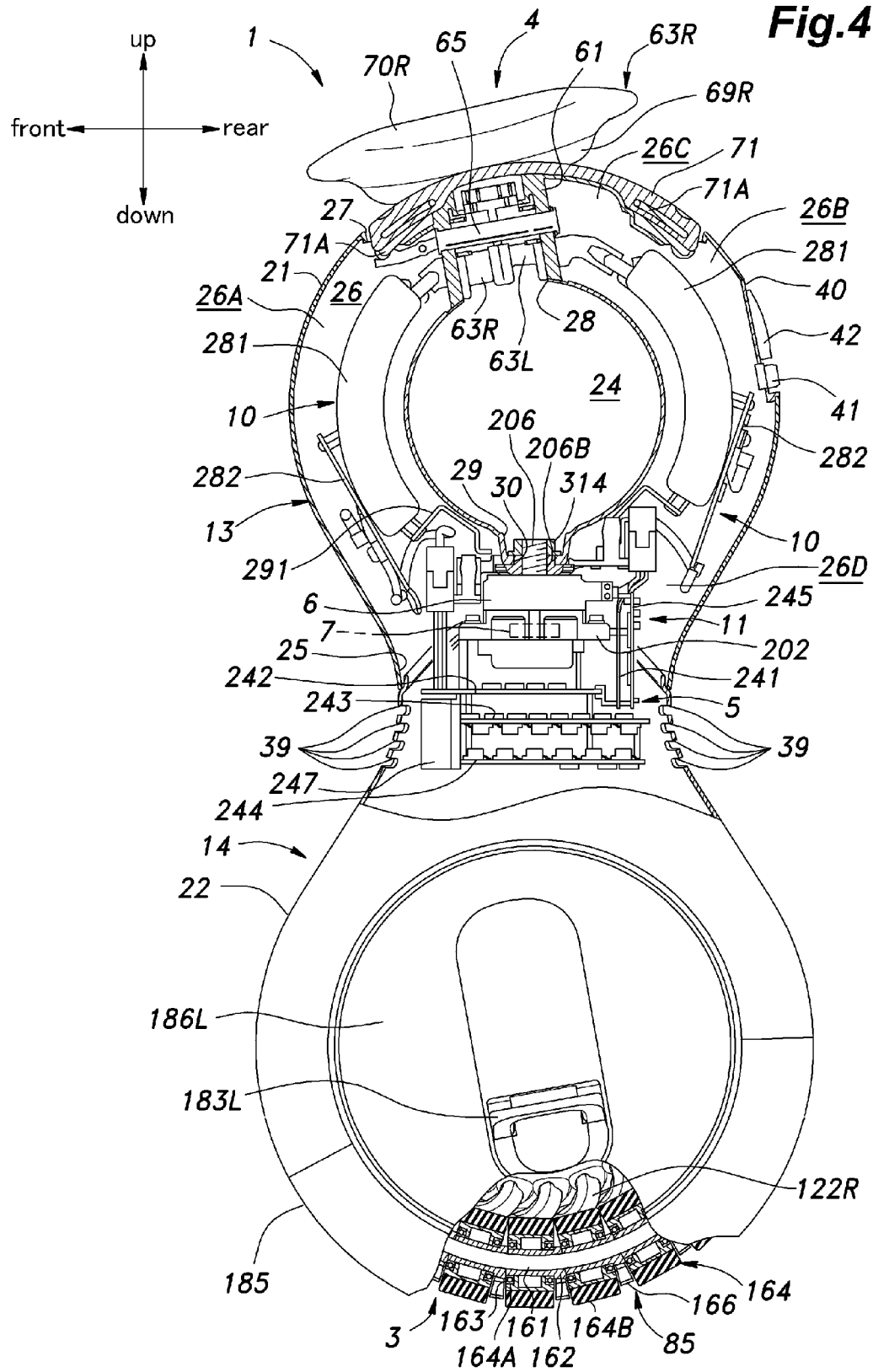
FIG. 4 is a sectional view taken along line IV-IV of FIG. 1.

As shown in FIG. 4, the upper frame 21 is shaped in an annular shape so that a saddle storage space 24 may be laterally passed through a central part thereof This annular shaped part is provided with a hollow interior defining an internal space 26 for receiving the battery unit 10 or the like. The lower end of the upper frame 21 is formed with a lower opening 25 (see FIG. 3) that faces downward, and the upper end of the upper frame 21 is formed with an upper opening 27 that faces upward. The upper wall of the saddle storage space 24 is provided with a saddle mounting hole 28 communicating the internal space 26 with the saddle storage space 24. The lower wall of the saddle storage space 24 is formed with a connecting recess 29 recessed downward from the saddle storage space 14. The bottom of the connecting recess 29 is centrally formed with a connecting hole 30 that is passed across the lower wall. In this vehicle 1, a front internal space 26A and a rear internal space 26B of the internal space 26 of the upper frame 21 forms an annular battery storage space for receiving the battery unit 10 therein.

As shown in FIG. 3, the lower frame 22 is provided with an upper opening 31 and a lower opening 32 so as to define a tubular shape. The lower frame 22 is provided with a pair of side walls 33 extending vertically in a mutually parallel relationship. The lower frame 22 is also provided with front and rear walls 34 which diverges in the fore and aft direction as one moves from the upper part thereof to the lower part thereof, and the lower part of the lower frame 22 is provided with a semi-circular shape as seen from a side. The semi-circular lower part of the lower frame 22 defines a storage space 35 for receiving an upper half of the propulsion unit 3.

Each side wall 33 is formed with a semi-circular notch 36 connected to the lower opening 32. The two notches 36 are coaxially disposed to each other with respect to a laterally extending axial line. At the boundary between each notch 36 and the lower opening 32 is provided a pair of projecting pieces 37 that form circumferential extensions of the periphery of the notch 36. An upper part of each of the front and rear walls 34 adjacent to the narrowed portion 2A is formed with ventilation slots 39 which are each laterally elongated and are arranged vertically in a mutually parallel relationship.

Figure 7:
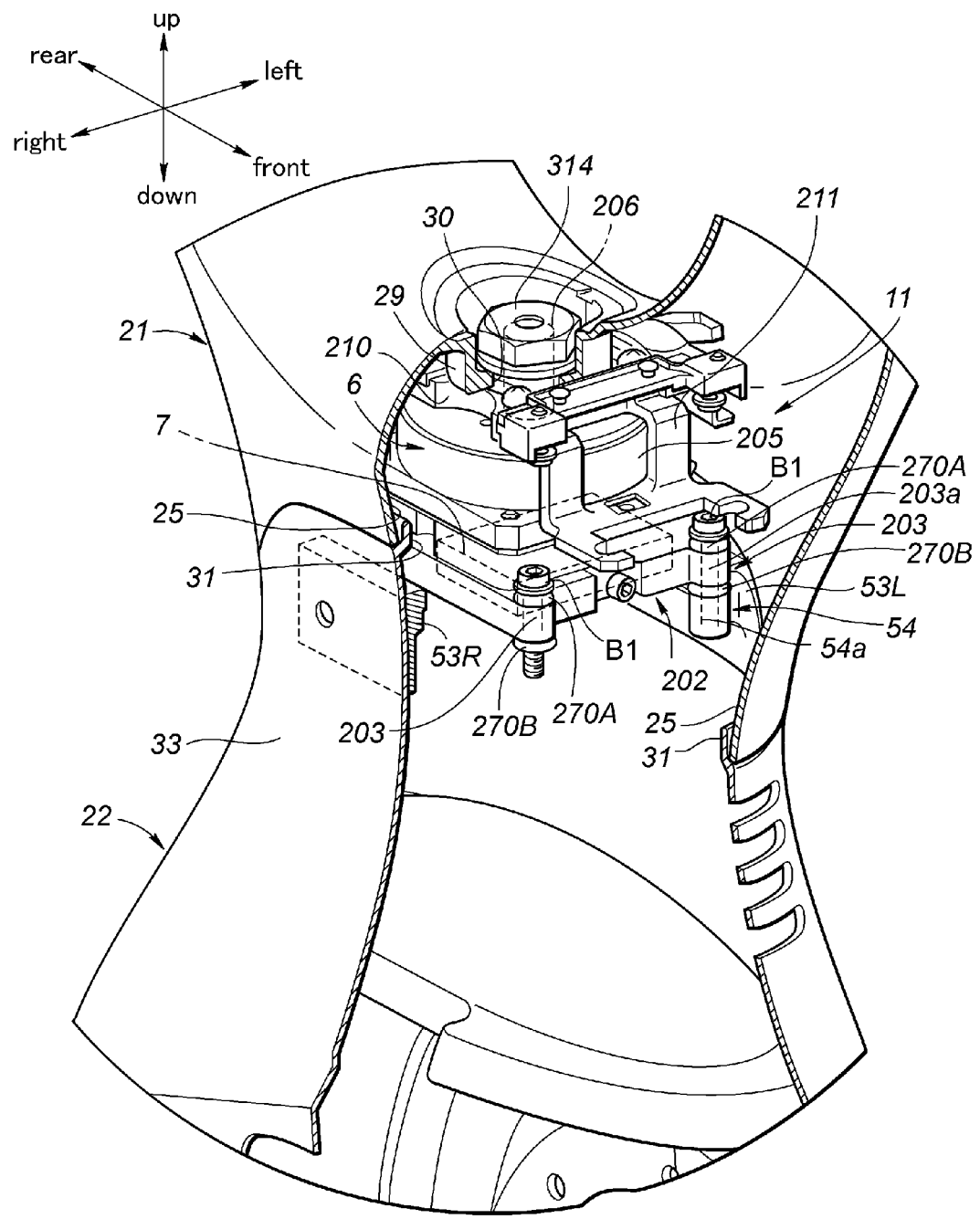
FIG. 7 is a partly broken away perspective view showing a narrowed portion of the inverted pendulum type vehicle.

As shown in FIG. 7, a metallic support base 53L, 53R is bonded to the inner surface of each side wall 33 of the lower frame 22 adjacent to the upper opening 31. Each metallic support base 53L, 53R extends in the fore and aft direction, and defines a horizontal upper surface. Each of the front and rear ends of each support base 54 forms a connecting portion 54 having a female thread hole 54 passed vertically therethrough.

<Structure of the Seat Unit>

Figure 6:
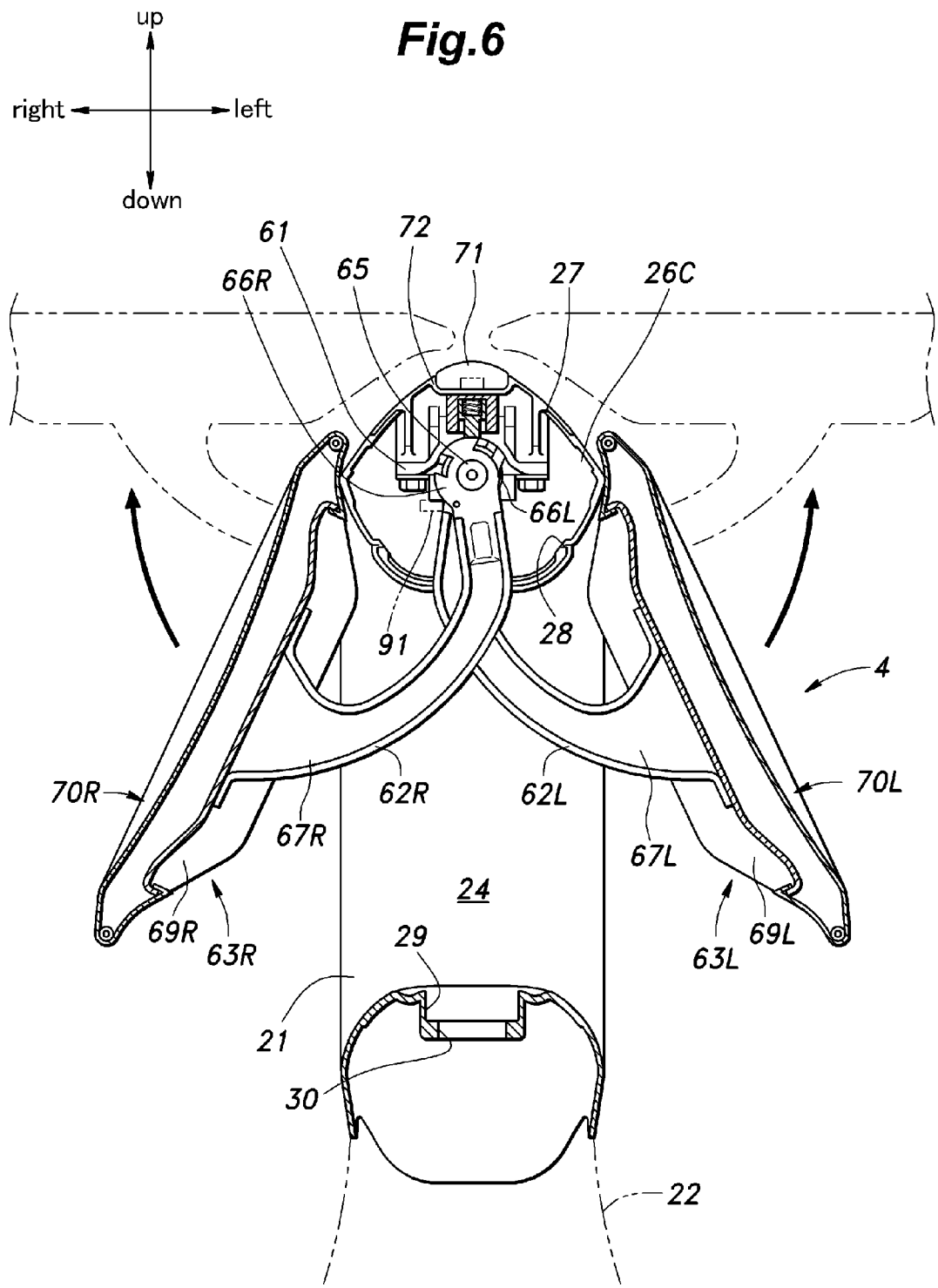
FIG. 6 is a sectional view taken along line VI-VI of FIG. 1.

As shown in FIG. 6, the seat unit 4 comprises a base main body 61, a pair of saddle arms 62L and 62R and a pair of saddle parts 63L and 63R. The base main body 61 is placed in an upper internal space 26C from the upper opening 27 of the upper frame 21, and closes the upper opening 27 with an upper wall connected to the base main body 61. The base main body 61 is provided with a support shaft 65 extending in the fore and aft direction in a lower part thereof.

The support shaft 65 pivotally supports base ends 66L and 66R of the saddle arms 62L and 62R. Each saddle arm 62L, 62R extends from the base end thereof 66L, 66R through a saddle mounting hole 28 of the upper frame 21, and is provided with a free end 67L, 67R located outside of the upper frame 21. The right saddle arm 62R is rotatable between a retracted position (second position) where the free end thereof 67R is located in a part of the saddle storage space 24 lower than the base end thereof 66R, and a deployed position (first position) where the free end 67R is located to the right of the base end 66R. The right saddle arm 62R is curved in such a manner that a convex side thereof faces downward at the deployed position. The left saddle arm 62L, which is substantially symmetric to the right saddle arm 62R, is also rotatable between a retracted position (second position) and a deployed position (first position), and is curved so that a convex side thereof faces downward, in a similar fashion.

The two saddle arms 62L and 62R are connected to each other via a link mechanism which causes one of the saddle arms to be retracted when the other saddle arm is retracted, and one of the saddle arms to be deployed when the other saddle arm is deployed. The base main body is provided with a lock mechanism (not shown in the drawings) that retains the saddle arms 62L and 62R at the retracted position and the deployed position by engaging the saddle arms 62L and 62R when the saddle arms 62L and 62R are located at the retracted position and the deployed position, respectively.

Each saddle part 63L, 63R includes a support portion 69L, 69R at the free end 67L, 67R of the corresponding saddle arm 62L, 62R and a disk shaped cushion portion 70L, 70R fitted on the corresponding support portion 69L, 69R. Each cushion portion 70L, 70R is provided with a seating surface 70La, 70Ra for placing the corresponding hip or thigh of the user (or the rider). When the saddle arms 62L and 62R are in the deployed position (as indicated by the double-dot chain-dot line in FIG. 6), each cushion portion 70L, 70R is located above the corresponding support portion 69L, 69R, and each seating surface 70La, 70Ra faces upward. The load of the rider D seated on the seat unit 4 is applied to the upper frame 21 via the saddle parts 63L and 63R, the saddle arms 62L and 62R and the base main body 61.

Figure 2:
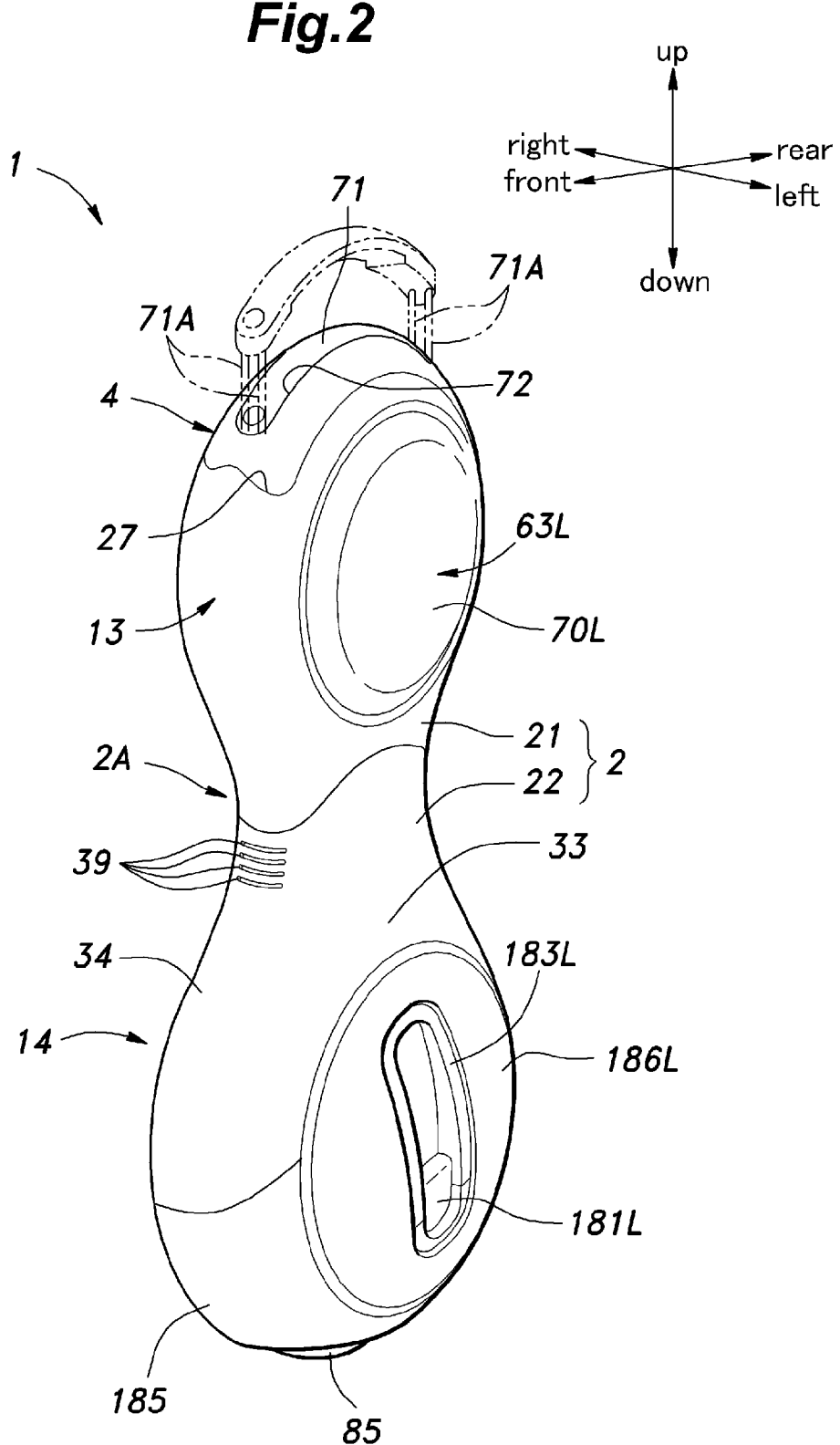
FIG. 2 is a perspective view of the inverted pendulum type vehicle (with the saddle and the steps retracted)

When the saddle arms 62L and 62R are in the retracted position (See FIG. 2), the support portions 69L and 69R of the saddle parts 63L and 63R are located in the saddle storage space 24, and the soft cushion portions 70L and 70R are exposed from the peripheral wall of the upper frame 21.

Figure 9:
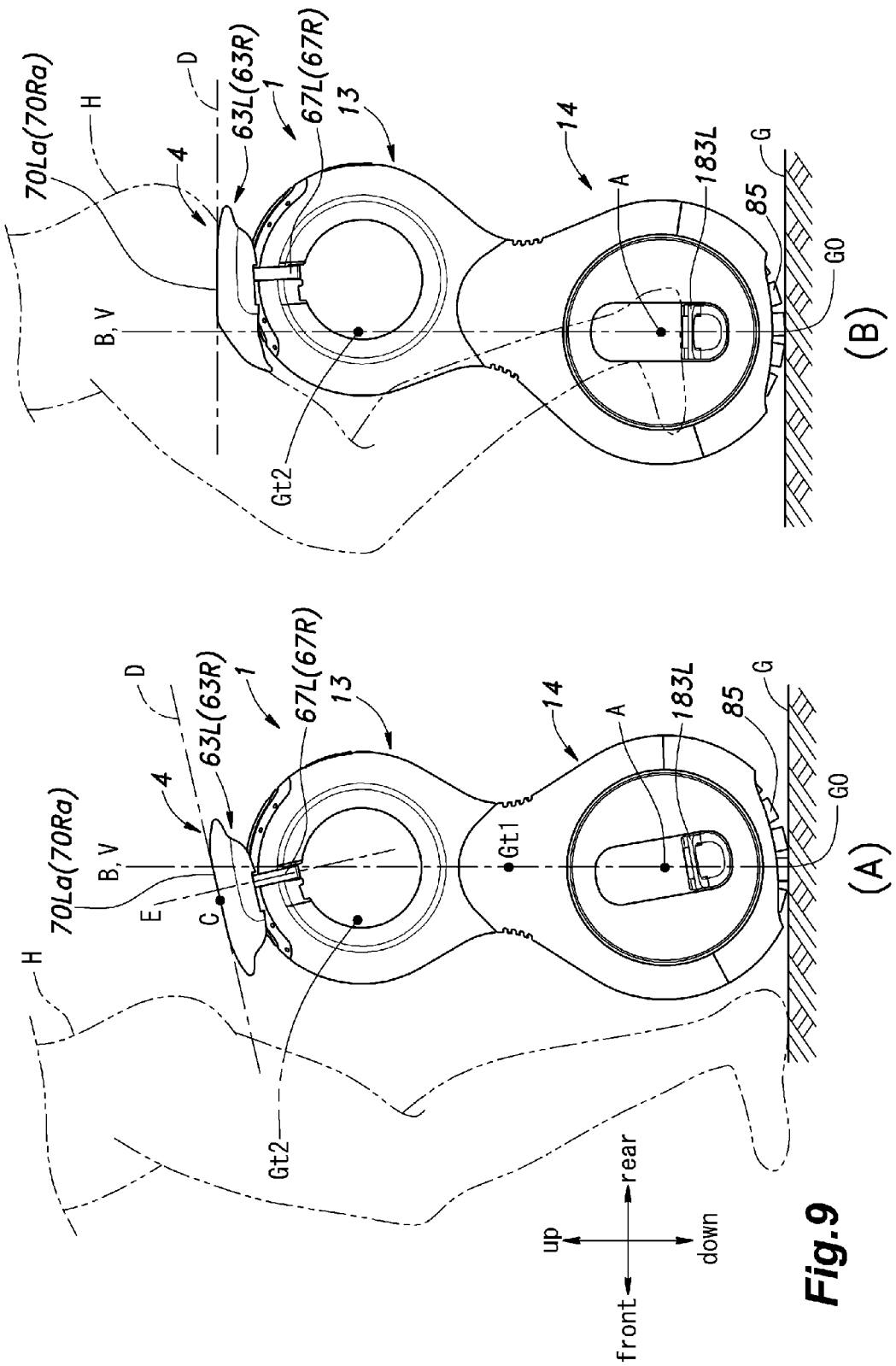
FIGS. 9(A) to 9(B) are fragmentary sectional views showing the movement of a grip handle from a retracted position to a deployed position.
Figure 10:
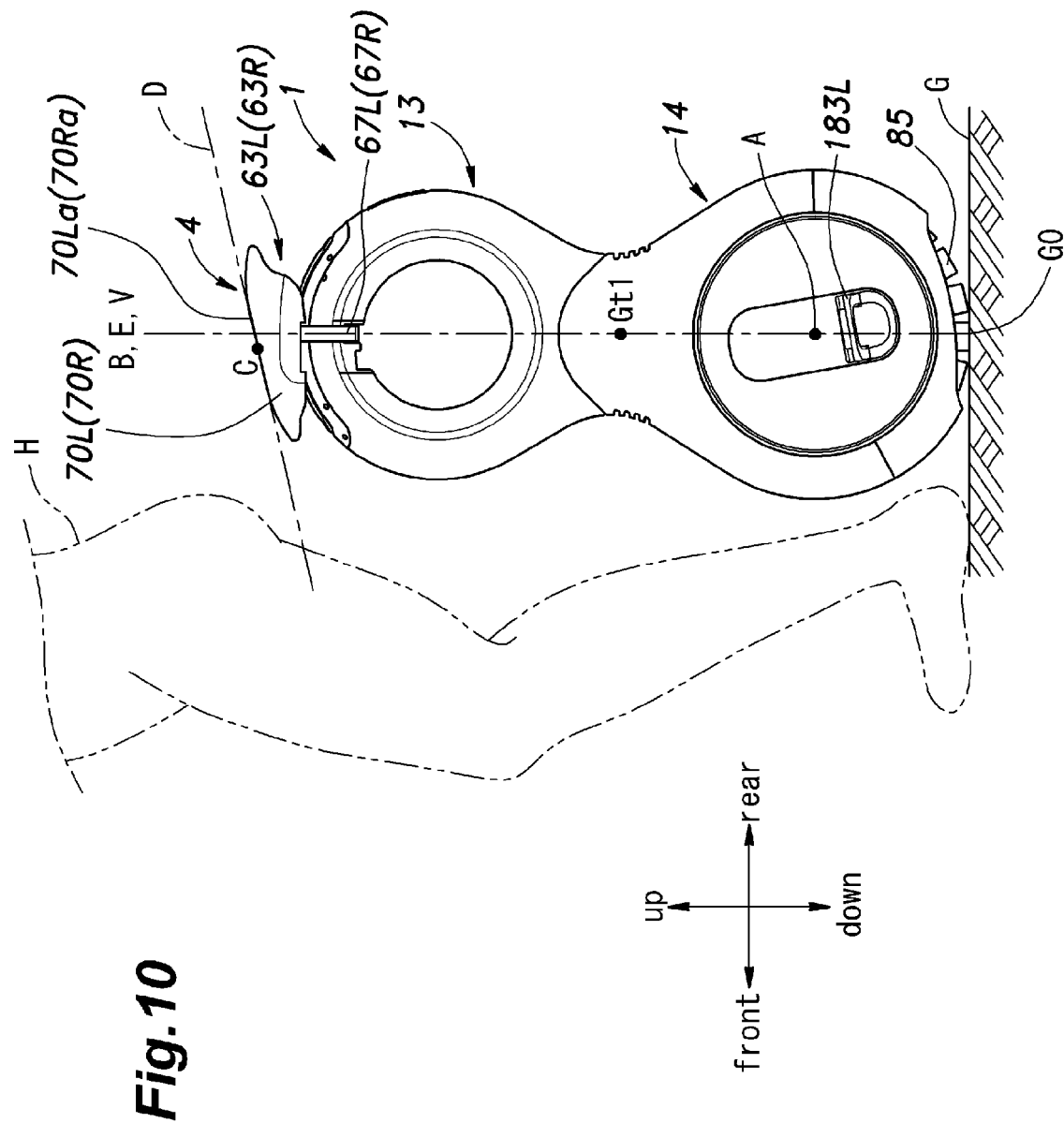
FIG. 10 is a side view of a modification of the seat unit shown in FIG. 9(A).

As shown in FIG. 9, each saddle part 63L, 63R is configured such that at least the center C of the seating surface 70La, 70Ra is located forward of an axial line B extending through the rotational center A of the main wheel 85 and the gravitational center Gt1 of the vehicle. As shown in FIG. 9(A), when the rider H is yet to ride the vehicle, the seating surface 70La, 70Ra slants forward with respect to a horizontal plane (along the fore and aft direction) as indicated by the imaginary line D. This can be accomplished by tilting forward an imaginary line E (along which the free end 67L, 67R of the saddle arm 62L, 62R supporting each saddle part 63L, 63R extends as seen from a side) with respect to the axial line B. It can also be accomplished by modifying the shape of the cushion portions 70L and 70R as shown in the modified embodiment of FIG. 10.

The seat unit 4 serving as an object support unit for the vehicle 1 is not limited to the one for supporting a rider as disclosed in the illustrated embodiment, but may also be configured to support any object (such as cargo that is to be transported by the user). In such a case, the shape of the saddle 63 can be modified as required depending on the object to be supported.

<Grip Handle>

Inside an upper wall extending from an upper part of the base main body 61 is provided a retractable grip handle 71 for enabling a user to support the vehicle. When not in use, the grip handle 71 is received in a handle storage space 72 recessed in the upper wall of the base main body 61 as indicated by the solid lines in FIG. 2. When the user desires to use the grip handle 71, the grip handle 71 is raised above the base main body 61 as front and rear leg portions 71A thereof slide upward as indicated in the double-dot chain-dot lines in FIG. 2. The user can lift and transport the vehicle 1 or prevent the vehicle from falling when the vehicle is not in operation by grabbing the grip handle 71.

<Structure of the Propulsion Unit>

Figure 5:
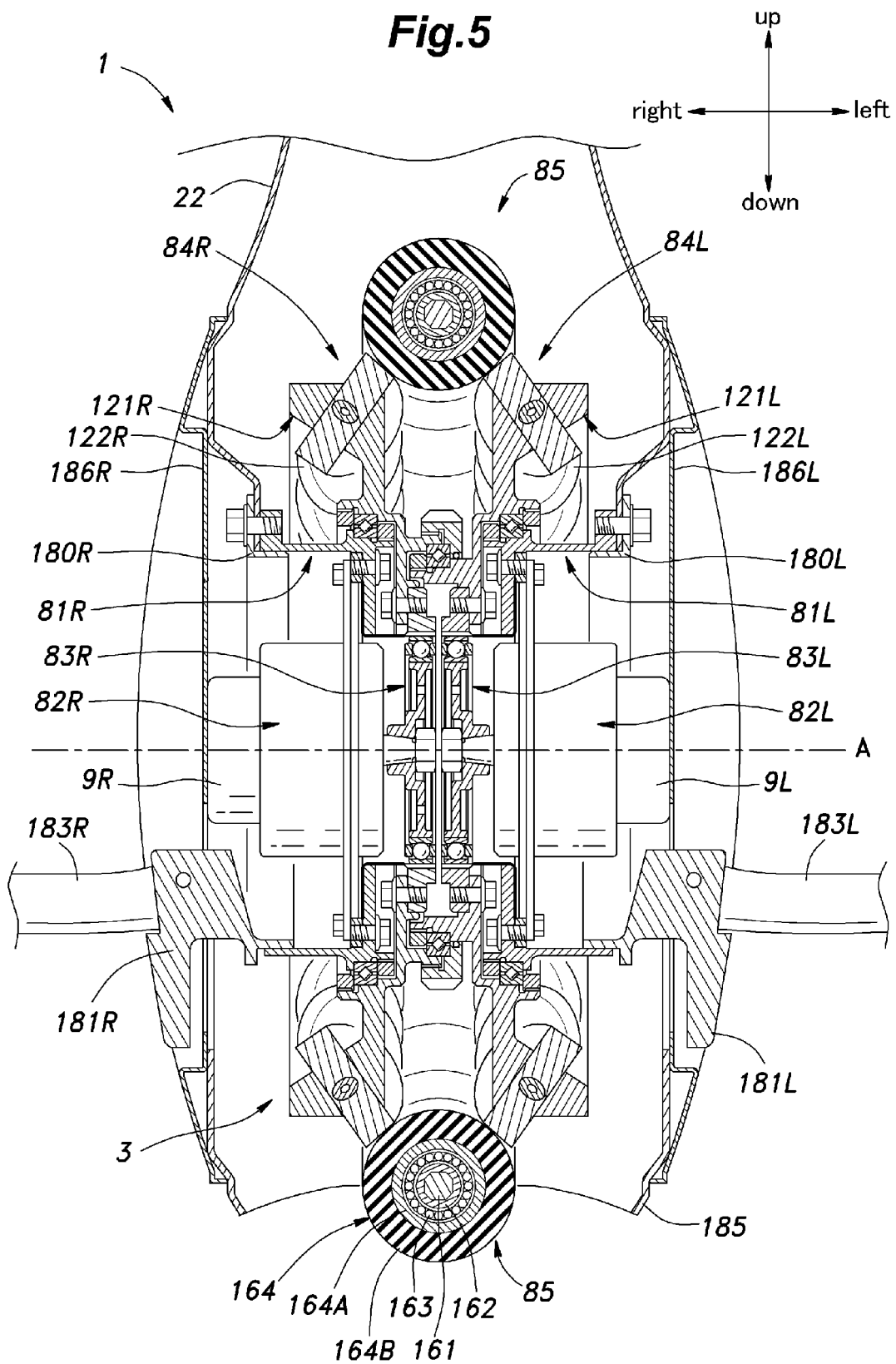
FIG. 5 is a sectional view taken along line V-V of FIG. 1.

As shown in FIGS. 3 to 5, the propulsion unit 3 comprises a pair of mount members 81L and 81R located on either side thereof as support members, a pair of electric motors 82L and 82R mounted on the corresponding mount members 81L and 81R, respectively, a pair of drive members 84L and 84R rotatively actuated by the corresponding electric motors 82L and 82R via wave gear devices 83L and 83R, respectively, and a main wheel 85 rotatively actuated by the drive members 84L and 84R. The electric motors 82L and 82R consisting of DC motors and the wave gear devices 83L and 83R may consist of those with per se known structures. The output of each of the electric motors 82L and 82R is reduced in speed by the corresponding wave gear device 83L, 83R and is then transmitted to the corresponding drive member 84L, 84R (drive disk 121L, 121R).

Each drive member 84L, 84R includes a drive disk 121L, 121R and a plurality of drive rollers 122L, 122R rotatably supported by the corresponding drive disk 121L, 121R. The drive disks 121L and 121R are spaced away from each other by a prescribed distance in the operating condition (or in the assembled condition of the drive members 84L and 84R). The main wheel 85 is interposed between the right and left sets of the drive rollers 122L and 122R.

The main wheel 85 comprises an endless annular member 161 having a polygonal cross section, a plurality of inner sleeves 162 fitted on the circumference of the annular member 161 and a plurality of cylindrical driven rollers 164 rotatably supported around the corresponding inner sleeves 162 via a ball bearing 163. Each driven roller 164 comprises a tubular metallic member 164A fitted on the outer circumference of the corresponding ball bearing 163, and a tubular rubber member 164B vulcanized and fitted on the outer circumferential surface of the corresponding tubular metallic member 164A. The material of the tubular rubber member 164B is not limited to rubber, but may consist of other resilient elastomeric material. The tubular rubber members 164B of the driven rollers 164 engage the road surface when the vehicle 1 is in operation (or traveling).

The driven rollers 164 as well as the inner sleeves 162 are arranged circumferentially along the annular member 161, and define the effective outer circumferential surface of the main wheel 85. Each driven roller 164 is rotatable around the tangential line of the annular member 161 at the point where the driven roller 164 is located.

The main wheel 85 is assembled with the drive members 84L and 84R by being interposed between them. In this state, the outer circumferential surface of the tubular rubber member 164B of each driven roller 164 is engaged by the outer circumferential surfaces of the corresponding drive rollers 122L and 122R so that the rotational force (propelling force) of the drive disks 121L and 121R is frictionally transmitted to the driven rollers 164 of the main wheel 85 via the drive rollers 122L and 122R. For the details of the positional relationship between the drive rollers 122L and 122R and the main wheel 85 and the mode of driving the main wheel 85, references should be made to WO 2008/139740.

<Structure of the Steps>

As shown in FIG. 3, a pair of step bases 180L and 180R are provided on either side wall 33 of the lower frame 22. Each step base 180L, 180R is made of an annular metallic member which extends along the periphery of the semi-circular notch 36 and the two projecting pieces 37 of the corresponding side wall 33. The step bases 180L and 180R and steps 183L and 183R pivotally supported by the step bases 180L and 180R, respectively, jointly form a step unit for supporting the both feet of the rider. The base end of each step 183L, 183R is pivotally supported by a part of the corresponding step base 180L, 180R adjacent to a projecting portion 181L, 181R thereof via a pin extending in the substantially fore and aft direction so that the step 183L, 183R is rotatable between a retracted position (See FIG. 2) where the free end of the step 183L, 183R is located vertically above the base end thereof and the step 183L, 183R extends along the lower frame 22, and a deployed position (See FIG. 1) where the free end of the step 183L, 183R is located laterally outside of the base end thereof and the step 183L, 183R extends laterally outward from the lower frame 22.

Each step base 180L, 180R and the corresponding mount member 81L, 81R are joined to each other with the peripheral part of the notch 36 and the two projecting pieces 37 interposed between them by using threaded bolts. Thereby, the step bases 180L and 180R and the propulsion unit 3 are jointly secured to the lower frame 22.

The strain sensor 8L, 8R is attached to the inner surface of each step base 180L, 180R. Each strain sensor 8L, 8R consists of a per se known strain gauge, and detects the stress of the step base 180L, 180R when a load is applied to the corresponding step 183L, 183R.

The lower end of the lower frame 22 is provided with a lower cover 185 for concealing the lower half of the propulsion unit 3 except for the part thereof engaging the road surface. The outer surface of each side wall 33 of the lower frame 22 is fitted with a side cover 186L, 186R for concealing the step base 180L, 180R while exposing the step 183L, 183R and the projecting portions 181L, 181R.

<Structure of the Electric Unit>

As shown in FIG. 7, the control unit 5 (not shown in FIG. 7) forming the electric unit 11, the load sensor 6 and the tilt sensor 7 are integrally mounted on an electric mount frame 202 serving as a main structural frame. In the following description of the electric unit 11, the fore and aft, lateral and vertical directions are defined with respect to the electric unit 11 as mounted on the lower frame 22.

The electric mount frame 202 essentially consists of a rectangular frame member defining a central opening which is dimensioned so as to rest upon the support bases 53 secured to the corresponding side walls 33 along the side edges thereof. Each side edge of the electric mount frame 202 is provided with a pair of mounting portions 203 formed with through holes 203a so as to correspond to threaded holes 54a of connecting portions 54 provided in the corresponding support base 53.

The load sensor 6 consists of a tri-axial force sensor that can detect moments around the z-axis (vertical direction), x-axis (fore and aft direction) and y-axis (lateral direction), and includes a body portion 205 receiving a sensor circuit board (not shown in the drawings) therein and fixedly attached to the upper surface of the electric mount frame 202 by using threaded bolts, and an input shaft 206 extending upward from the body portion 205 and formed with a male thread along the length thereof The body portion 205 rests upon and is fixedly secured to the electric mount frame 202.

The base end of the input shaft 206 is fixedly secured to a planar connecting member base 210. The connecting member base 210 is centrally provided with a threaded hole, and is secured to the input shaft 206 by threading the thread formed around the base end 206B (See FIG. 4) of the input shaft 206 into the threaded hole. A free end of the input shaft 206 projects upward from the connecting member base 210.

With the connecting member base 210 attached to the input shaft 206, a first connector base 211 is attached to a front part of the connecting member base 210 by using threaded bolts, and extends forward. A second connector base 212 is attached to a rear part of the connecting member base 210 by using threaded bolts.

The tilt sensor 7 consists of a per se known gyro sensor, and is secured to the electric mount frame 202 by using threaded bolts inside the electric mount frame 202 which thereby serves as a housing for the tilt sensor 7. The tilt sensor 7 detects the inclination angle relative to the plumb vertical direction.

<Structure of the Battery Unit>

As shown in FIG. 4, the battery unit 10 includes a pair of battery modules 281 and a pair of battery management circuit boards 282. Each battery management circuit board 282 is incorporated with a CPU forming a microcomputer and memory not shown in the drawings. Each battery management circuit board 282 is used for selecting the battery module 281 to be used, and controlling the charge and discharge condition of the battery modules 281.

The battery modules 281 are given with a curved shape with a prescribed curvature so as to conform to the annular interior of the upper frame 21. Therefore, the modules 281 can be passed into the front space 26A and the rear space 26B of the upper frame 21 from a lower opening 25 of the upper frame 21. Once placed inside the upper frame 21, the battery modules 281 are supported from below by a battery bracket 291 which is in turn secured to support bases of the upper frame 21 by using threaded bolts.

<Structure of the Inverted Pendulum Control System>

As shown in FIG. 4, the control unit 5 comprises a control circuit board 241 incorporated with a control circuit 261 (See FIG. 8) for controlling the electric motors 82L and 82R, a power source circuit board 242 for converting the power source voltage supplied by the battery unit 10 to a prescribed voltage, a pair of motor driver circuit boards 243 and 244 incorporated with driver circuits (inverter circuits) for the PWM control of the electric motors 82L and 82R, an I/O interface circuit 245 incorporated with an input interface circuit 265 (See FIG. 8) and an output interface circuit 266 (See FIG. 8), and an air fan 247 for cooling purpose.

Figure 8:
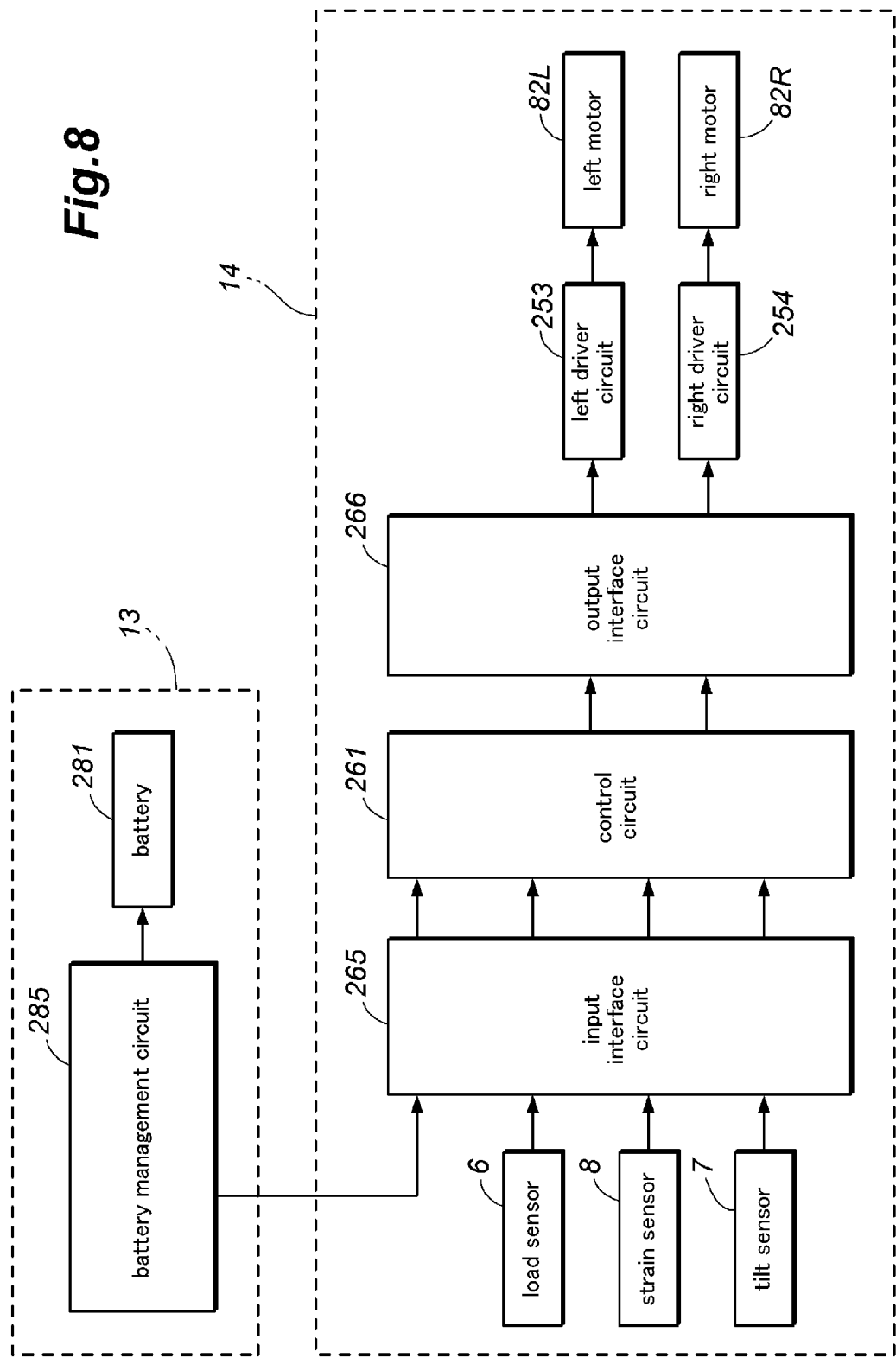
FIG. 8 is a simplified block diagram of a control system of the inverted pendulum type vehicle.

As shown in FIG. 8, the control circuit 261 receives the signals from the load sensor 6, the tilt sensor 7 and the strain sensors 8L and 8R via the input interface circuit 265. The control unit 261 is configured to perform the inverted pendulum control, and generates the required PWM signal for driving the left and right driver circuit 253 and 254 according to the various input signals so as to maintain the upright posture of the vehicle 1.

The load sensor 6 forwards a signal corresponding to the load applied to the input shaft 206 to the control circuit 261. The strain sensors 8L and 8R forward signals corresponding to the loads applied to the steps 183L and 183R to the control circuit 261. The tilt sensor 7 forwards a signal corresponding to the inclination thereof with respect to a prescribed reference line to the control circuit 261.

According to the output signal from the load sensor 6, the control unit 261 computes the load applied to the input shaft 206, and determines if a rider H is seated on the seat unit 4 by comparing the computed load with a prescribed threshold value. Also, according to output signals from the strain sensors 8L and 8R, the control unit 261 computes the loads applied to the steps 183L and 183R, and determines if the rider is placing the rider's feet on the steps 183L and 183R by comparing the computed loads with a prescribed threshold value. According to the determination results indicating if the rider is seated on the seat unit 4 and if the feet of the rider are placed on the steps 183L and 183R, the control unit 261 determines if a rider is aboard the vehicle 1 and the riding posture of the rider.

According to the output signal from the tilt sensor 7, the control unit 261 computes an inclination angle $\theta$ (FIGS. 9(A) and 9(B) correspond to the state where $\theta=0$) of the axial line B of the vehicle 1 with respect to the plumb vertical axial line V according to a prescribed algorithm. When a xyz coordinate system having an x-axis extending in the fore and aft direction, a y-axis extending in the lateral direction and a z-axis extending in the vertical direction is assumed, the inclination angle $\theta$ includes a x-component which is given as an inclination angle $\theta x$ in the x axis direction, and y-component which is given as an inclination angle $\theta y$ in the y axis direction.

The control unit 261 performs the inverted pendulum control according to the inclination angle $\theta$. In the inverted pendulum control, the inclination angle $\theta$ is maintained to be equal to a control target value consisting of a certain reference angle $\theta t$ so as to maintain the overall gravitational center line (gravitational center Gt1 of the vehicle 1 without a rider or gravitational center Gt2 of the vehicle 1 with a seated rider) of the vehicle is located exactly above the ground contact point of the propulsion unit 3 (main wheel 85). As the gravitational center of the vehicle varies depending on the presence of a rider and the riding posture of the rider, different reference angles are defined for the vehicle 1 without a rider, the vehicle 1 with a seated rider and the vehicle 1 with a standing rider.

The control unit 261 is configured to achieve a plurality of prescribed operation modes. When it is determined that there is a rider, a rider mode is selected as the operation mode. In this case, the control unit 261 sets various inverted pendulum control parameters suitable for the rider mode such as setting the target value (reference angle $\theta t$) for the inclination angle $\theta$ of the vehicle 1 according to the position of the gravitational center Gt2 of the overall vehicle 1 including the weight of the rider detected by the load sensor 6. When no rider is detected, the control circuit 261 selects an upright mode as the operation mode, and sets various inverted pendulum control parameters suitable for the upright mode such as setting the target value for the inclination angle $\theta$ of the vehicle 1 according to the position of the gravitational center Gt1 of the overall vehicle 1 not including the weight of the rider.

In the vehicle 1 having the structure described above, as shown in FIG. 9(A), when the rider is about to get aboard the vehicle 1, the weight of the rider H is applied to the saddle 63, and the position of the gravitational center of the overall vehicle 1 including the weight of the rider moves forward (as indicated by the gravitational center Gt2 in FIG. 9(A)). At this time, the control circuit 261 performs the inverted pendulum control such that the gravitational center Gt2 is located exactly above the ground contact point Go of the main wheel 85 as shown in FIG. 9(B). As a result, the main wheel 85 moves forward on the ground surface G (or toward the space between the two legs of the rider H). Therefore, even when there is an obstacle (not shown in the drawings) on the ground surface G behind the vehicle, the main wheel 85 rolling on the ground surface G is prevented from coming into contact with the obstacle, and the boarding of the rider H on the vehicle is facilitated. In particular, when the rider is about to get aboard the vehicle 1, because the seating surfaces 70La and 70Ra of the saddle parts 63L and 63R tilt forward, the rider H is enabled to sit on the saddle with ease. Once the rider has gotten aboard the vehicle 1, and the vehicle remains stationary, the seating surfaces 70La and 70Ra of the saddle parts 63L and 53R extend horizontally as indicated by the imaginary line D.

Although the present invention has been described in terms of a preferred embodiment thereof, it is obvious to a person skilled in the art that various alterations and modifications are possible without departing from the scope of the present invention. For instance, the inverted pendulum type vehicle of the present invention may also be provided with a plurality of main wheels, instead of only a single main wheel. The various components of the inverted pendulum type vehicle according to the present invention described above are not necessarily indispensable for the present invention, but may be omitted in a selective manner without departing from the spirit of the present invention.

GLOSSARY

1 inverted pendulum type vehicle
2 frame
2A narrowed portion
3 propulsion unit
4 seat unit
5 inverted pendulum control unit
6 load sensor
7 tilt sensor
8L, 8R strain sensor
10 battery unit
11 electric unit
13 upper structure
14 lower structure
21 upper frame
22 lower frame
24 saddle storage space
26 inner space
28 saddle mounting hole
29 connecting recess
30 connecting hole
39 ventilation slot
63L, 63R saddle part
70La, 70Ra seating surface
71 grip handle
82L, 82R electric motor
84L, 84R drive member
85 main wheel
183L, 183R step
185 lower cover
186L, 186R side cover
202 electric mount frame
205 body member
206 input shaft
210 connecting member base
241 control circuit board
242 power source circuit board
243 motor driver circuit board
244 motor driver circuit board
246 air passage
247 air fan
261 control circuit
281 battery module
282 battery management circuit board

The invention claimed is:

1. An inverted pendulum vehicle configured to travel on a ground surface while maintaining an upright posture under an inverted pendulum control, comprising:
   a base frame supporting a propulsion unit, the propulsion unit including a main wheel configured to roll on the ground surface; and
   a seat unit provided on the base frame for supporting hips of a rider;
   wherein the seat unit includes a saddle having at least a center located ahead of an axial line extending between a rotational center line of the main wheel and a gravitational center of the inverted pendulum vehicle; and
   wherein the saddle is provided with a seating surface which tilts forwards with respect to a horizontal line when the base frame is in the upright posture without a rider.

* * * * *